May 28, 1968 B. M. ROSENHECK 3,385,928

AUTOMATIC PHASING SYSTEMS

Filed April 30, 1964 2 Sheets-Sheet 1

INVENTOR.
Bernard M. Rosenheck
BY E. R. Evans
ATTORNEY

INVENTOR.
Bernard M. Rosenheck
BY E. D. Evans
ATTORNEY

United States Patent Office 3,385,928

Patented May 28, 1968

3,385,928

AUTOMATIC PHASING SYSTEMS

Bernard M. Rosenheck, Bronx, N.Y., assignor to Litton Systems, Inc., Beverly Hills, Calif.

Filed Apr. 30, 1964, Ser. No. 363,775
13 Claims. (Cl. 178—69.5)

ABSTRACT OF THE DISCLOSURE

Mechanism for phasing two driven members which are to operate in synchronism and in phase, such as the scanning and recording devices of a facsimile transmitter and recorder. Phasing signals or pulses are generated, the time spacing between the pulses corresponding to the magnitude of the phase discrepancy at any instant. The rate of phase correction is reduced when the in-phase relation is approached, by pulse-shaping and gating means, to permit rapid phase correction during the initial stage of the phasing cycle.

Figure 1:
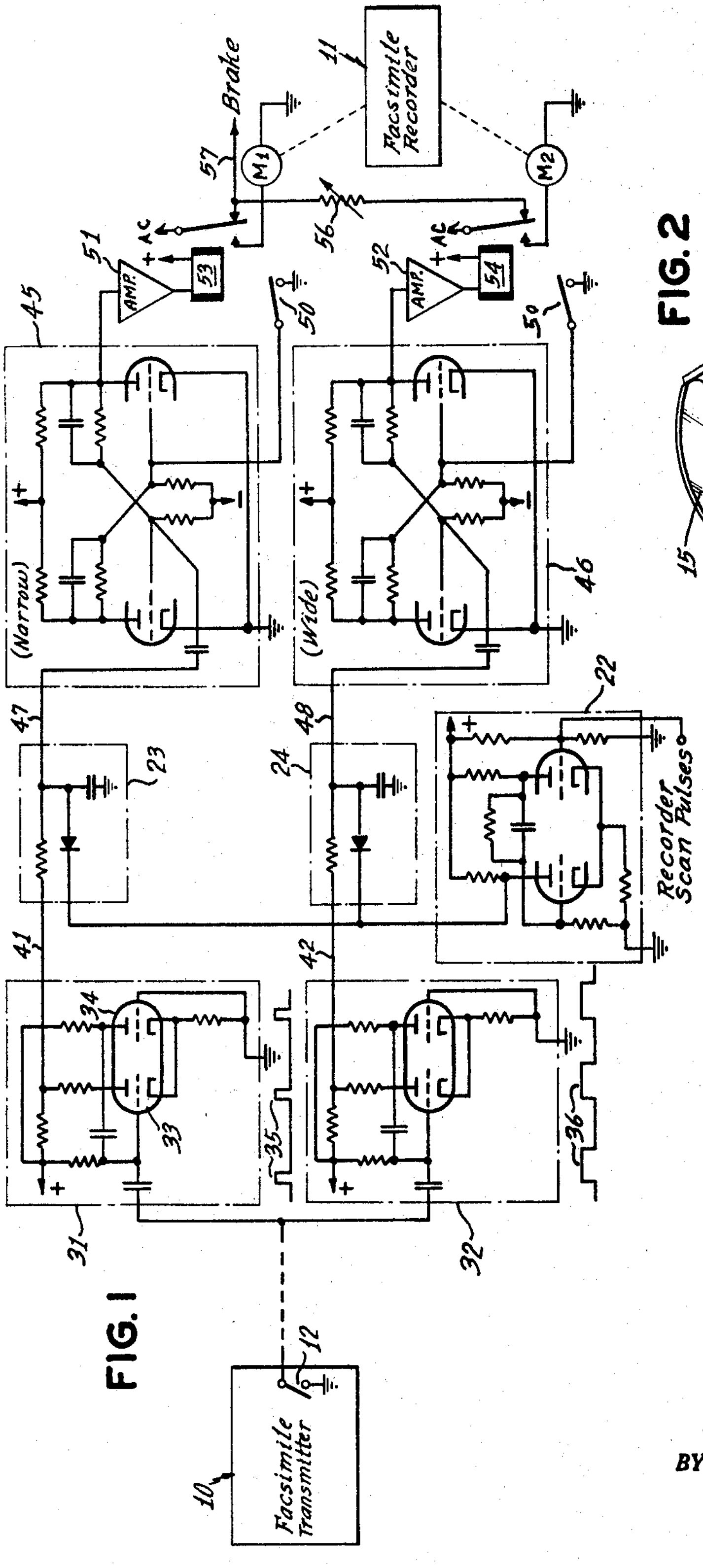

This invention relates to automatic phasing systems, more particularly to phasing systems for facsimile telegraph apparatus and the like.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

In general terms the object of the invention is to provide an improved phasing system of the character described which is fully automatic and reliable in operation, and which provides enhanced speed and accuracy of phasing in a system where two driven members are to be operated in synchronism and in phase, such as the scanning and recording mechanisms of a facsimile communications system.

A common form of facsimile phasing mechanism consists of a friction clutch for driving the facsimile recorder and an electromagnetic latch responsive to a phasing pulse from the transmitter, which releases the clutch to permit the synchronous drive of the recorder to start in phase with the transmitter. In many cases this mechanism has proved to be unsatisfactory because of the transient dynamics involved, and an arrangement for driving the facsimile recorder at non-synchronous speed until the in-phase relationship is reached has been found to be more reliable and accurate. In a system of this character it is desirable not only to effect accurate phase correction but to phase the recorder in a minimum time. The present invention minimizes this time in a simple and effective manner.

Accordingly it is another object of the invention to provide a facsimile phasing system in which phase correction is effected at a rapid rate during the initial part of the phasing cycle and then at a reduced rate as the in-phase relation of a scanning and recording mechanism is approached. This permits rapid, accurate phasing of the transmitter and recorder with consequent saving in the time required to transmit the phasing signals from the unit which is operating at fixed speed to the unit which is being corrected in phase, with resultant improvement in the over-all efficiency.

Another object of the invention is to provide reliable motor driving means for effecting both fast and slow phase correction of the recording mechanism in a facsimile system, with means for controlling said driving means which is dependent upon the magnitude of the out-of-phase relation of the recorder.

Another object of the invention is to provide novel means for detecting and utilizing the phase discrepancy between the transmitter and the recorder.

Still another object of the invention is to provide, in connection with a system employing two trains of pulses representing the position of the respective units to be phased, novel means such as a gate or pulse-coincidence detector for detecting the instant when the desired in-phase relation is approached, thus enabling a rapid phase correction rate to be slowed down before phase correspondence between the scanning and recording mechanisms is reached.

A still further object of the invention is to provide a novel dual-motor drive for effecting phase correction in a facsimile system or the like.

A still further object of the invention is to provide a novel braking mechanism for retarding and stopping the phase correction device, as phase correspondence is achieved.

In accordance with the invention as embodied in a facsimile system having scanning and recording mechanisms to be operated in desired phase relationship, means of a conventional character is provided for generating pulses representing the position of each of said members, for example generating a pulse at the transmitter at the beginning of each scanning line and generating a pulse at the recorder at the beginning of each recording line. In order to correct the phase relationship between the units before transmission is started, the phase of one of the units is adjusted, for example by rotating the stator of the synchronous driving motor. A two-speed drive is provided for turning the stator of the synchronous motor, first at relatively high speed of rotation and then as the in-phase condition is approached, at a lower speed. The drive may include two separate motors or any suitable arrangement which enables changing the phase correction rate. In order to effect the change from rapid to slow phase correction, the two trains of phasing pulses are shaped and impressed upon a pulse coincidence detector or diode gate, one of the control pulses being sufficiently wide so that an output pulse is produced before the mechanisms to be phased quite reach the in-phase relationship. This output pulse operates a relay switch which changes the motor drive of the phase correction mechanism to reduce the rate of phase correction as the mechanisms approach the in-phase relationship. One of the phasing pulses is also shaped to provide a control pulse of narrow width, and when this pulse coincides with the other phasing pulse, indicating phase correspondence between the scanning and recording mechanisms, the phase correction device is disabled so that the mechanisms continue to operate at synchronous speed and in phase.

In one embodiment of the invention, the phase correction device is driven by separate motors producing high and low output shaft speeds, thus driving the phase correction device at high speed for example only when the high-speed motor is energized. While in the embodiment of the invention to be described herein, phase correction is effected by rotating the stator of the synchronous driving motor and a dual-motor drive unit is utilized, obviously phase correction can be accomplished in many other ways as well known in the art, utilizing the novel control embodying a feature of the invention.

Figure 2:
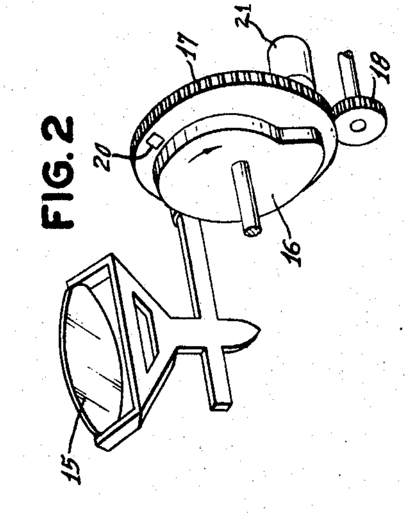
Figure 3:
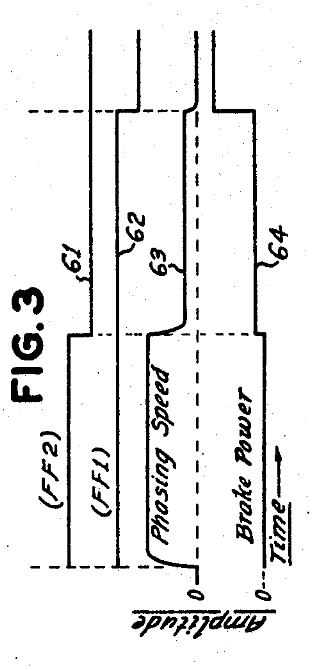
Figure 4:
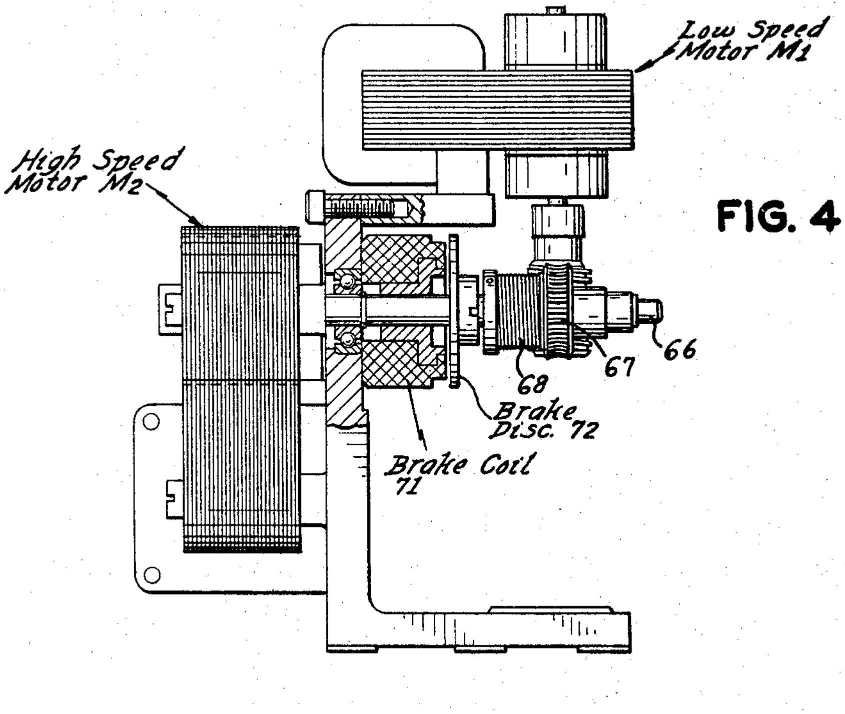
Figure 5:
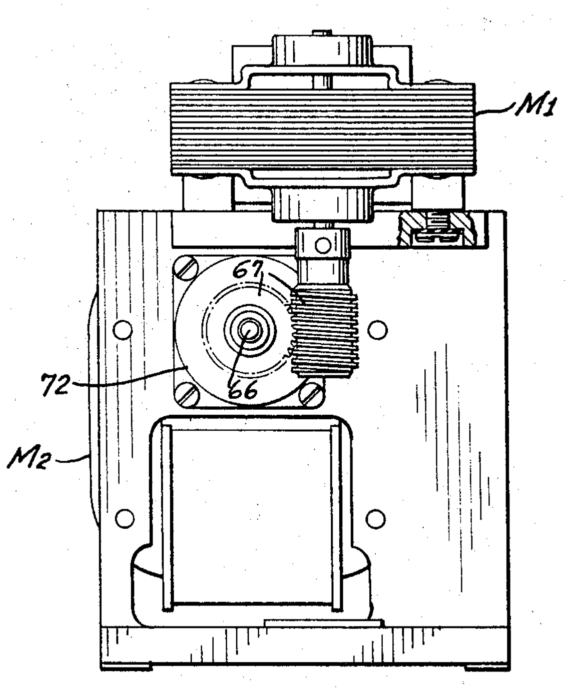

The above mentioned and other objects and advantages of the invention will appear from the following description of the embodiment thereof shown by way of example in the accompanying drawings, wherein FIG. 1 is a view, partially schematic, of a facsimile telegraph system for phasing a recorder with a remote transmitter;

FIG. 2 is a detailed view of a mechanism for generating the recorder phasing pulses;

FIG. 3 is a graph showing the time relation between the control currents applied to the phasing mechanism, the corresponding variations in phasing speed during the phasing cycle and the brake power applied to the drive for the phasing mechanism; and FIGS. 4 and 5 are front and side elevational views respectively, of a dual-motor drive unit that may be employed in the system of FIG. 1 to obtain two-speed phase correction.

The present invention may be utilized for phasing or framing driven mechanisms of various kinds which are to be maintained in synchronism and in phase even when located at spaced points, but for the purposes of explanation, the invention will be described in connection with a facsimile system embodying a transmitter and a recorder connected through a signal line or channel. Both facsimile units may be provided with conventional pulse-generating means which indicate the relative phase positions of the transmitter scanner and the recorder. The transmitter may be assumed for purposes of explanation to comprise a scanner consisting of a rotating copy drum or cylinder for supporting the copy which is scanned by conventional optical scanning mechanism. The synchronously rotating drum in the transmitter may be arranged to generate a phasing pulse at the beginning of each scanning line, said phasing pulse being employed to determine the phase relationship of the recording apparatus by comparing periodic pulses generated by the recorder with said phasing pulses. Thus the time spacing between the pulses from the scanner and the recording mechanism is a function of the displacement from the desired phase relation and coincidental pulses (or pulses having a predetermined time displacement) indicate the in-phase relation of the scanner and recorder mechanism. The general phasing system for producing and utilizing phasing pulses from a facsimile transmitter is conventional, being shown for example in many prior patents including the U.S. patent to A. G. Cooley, No. 2,275,249, granted Mar. 3, 1942.

The present invention overcomes the limitations of such prior systems in respect to accuracy and speed of phasing, especially in high-speed systems. Referring to the drawings, as shown in FIG. 1 the phasing system is arranged to phase the scanning mechanism of a facsimile transmitter 10 with the recording mechanism of a facsimile recorder 11. The scanning and recording mechanisms referred to are intended to represent any driven members to be operated in synchronism and in phase in the telegraph or communication art. In order to sense the displacement in phase between the transmitter 10 and the recorder 11, a contact 12 or equivalent device is provided for generating equally time spaced pulses representing the phase or angular position of the cyclically operating constant-speed scanning mechanism of the transmitter 10. Similarly the recorder 11 is provided with pulse generating means so that the phase discrepancy between the transmitter and the recorder is indicated by the spacing between the respective pulses. Thus as shown in FIG. 2, if the recorder mechanism for example includes a pivoted mirror 15 which is oscillated by a rotating cam 16 driven by gear 17 and pinion 18, the gear 17 may carry a soft iron block or slug 20 near the periphery of the gear. The iron block 20 cooperates with a stationary conventional magnetic pick-up head 21 to generate periodic pulses as the cam 16 rotates at synchronous speed. Photographic recording mechanism of this character is shown in detail in U.S. Patent No. 3,009,018 to H. Strickholm et al., disclosure of which is incorporated herein by reference. This prior patent illustrates by way of example a cyclically operating facsimile recorder mechanism adapted to be phased with a remote transmitter.

Referring again to FIG. 1, the periodic recorder scan pulses are amplified and shaped by a squaring circuit 22, for example the well-known Schmitt trigger circuit shown, and the negative output pulses of the Schmitt trigger 22 are impressed on two diode "and" gates 23 and 24, each comprising a series diode, and a second input circuit, whereby a negative output pulse from the gate 23 or 24 only occurs when the two input pulses coincide. Various forms of gating circuits or pulse-coincidence detectors are well known and may be substituted for that shown for the purpose of detecting coincidence between the input pulses from the transmitter scanner and the recorder mechanism.

In accordance with a feature of the invention, the phase control circuit is arranged to detect and respond to the magnitude of the out-of-phase relation between the transmitter and the recorder; thus during the initial stage of the phasing cycle, rapid phase correction may be effected while the spacing between the respective phasing pulses is greater than a predetermined amount, and then final phase correction is made at a slower rate so that the desired accuracy of the final phasing adjustment may be attained. In order to effect this result the pulses impressed upon the gates 23 and 24 from the transmitter 10 are of different widths or duration, and the gated output from one of said gates is employed to vary the phasing correction rate as will be described. As shown, the phasing pulses from the transmitter phasing pulse source 12 are impressed on two signal-shaping circuits consisting of monostable multivibrators 31 and 32 associated with the respective gates or pulse-coincidence detectors 23 and 24. The multivibrators 31 and 32 may be of a conventional type, each comprising two triodes 33 and 34, and shunt resistors, connected to reshape the phasing pulses received over the line circuit or channel. The graphs 35 and 36 represent the wave forms of the output pulses from the multivibrators which are impressed upon the gates 23 and 24, respectively, through conductors 41 and 42. It will be noted the leading edges of these pulses occur at the same time but the pulse output from the multivibrator 32 is in the form of wider pulses, for example about 10 times as wide as the pulses from the multivibrator 31. Thus if the pulses shown in the graph 35 are of the order of three milliseconds wide, the width of the wider pulses may be about 30 to 40 milliseconds wide. In other words, the last-mentioned pulses must be wider than the equivalent time-shaft in the phase position of the recorder mechanism during the period of rapid or high-speed phasing. Since the pulses in the conductor 42 are wider than those in the conductor 41, pulse coincidence will occur first on these wider pulses and a negative output pulse from the gate 24 will be generated sooner than a negative output pulse from the gate 23 (assuming that the spacing between the scanner phasing pulses and the recorder pulses indicates wide deviation in the phasing position of the scanning and recording mechanisms). Thus a control pulse is generated as the recorder mechanism approaches the in-phase relationship, which control pulse may be used to slow down the rate of phase correction. Subsequently the phasing pulses from the source 12 at the transmitter and the Schmitt trigger 22 at the recorder will coincide when the in-phase relationship is established, and a control pulse from the gate or pulse coincidence detector 45 may be used to disable the phasing device and permit continued operation of the transmitter and the recorder in the desired phase relationship. Obviously other means may be employed, as will be obvious to those skilled in the art, for detecting the approach of the in-phase relation in order to reduce the rate of phase correction. However the electronic shaping and pulse coincidence detection means shown has the advantages of simplicity and reliability at high pulse rates. The reliability factor is extremely important since normally a phasing operation takes place before each transmission of copy.

The pulses from the gates 23 and 24 control the "slow" and "fast" flip-flop circuits 45 and 46 through conductors 47 and 48, respectively. The flip-flop circuits 45 and 46, which are of conventional type, are set by closing contacts 50 manually or automatically at the commencement of the phasing cycle. The flip-flops are reset by the negative pulse from the Schmitt trigger 22 traversing the gate 23 or 24 when the gate is open. When the flip-flops are set by the closure of contacts 50, operating current flows through the amplifiers 51 and 52 to energize relays 53 and 54, thereby turning on the motors $M_1$ and $M_2$ which control the phasing of the recorder 11. When first the flip-flop 46 is reset, the relay 54 becomes de-energized, opens the circuit of motor $M_2$ and closes a circuit through resistor 56 to energize a brake mechanism to slow down the phasing rate. The series resistor 56 limits the braking current so that only partial braking is effected. When the in-phase relationship of the scanning and recording mechanisms is reached, a control pulse is generated in the output circuit 47 of the gate 23, thereby resetting the flip-flop 45 and de-energizing relay 53. The de-energization of relay 53 opens a circuit of the slow drive motor $M_1$ and applies full brake current to the brake to stop the phasing device. Since the phasing adjustment is discontinued practically instantaneously in response to the in-phase control pulse, the scanning and recording mechanisms continue to operate at synchronous speed and in phase.

In FIG. 3, the graphs 61 and 62 represent the variation in the current applied to relays 54 and 53 respectively by the flip-flops 46 and 45 and the associated amplifiers. As shown by the graph 63, the phasing speed or rate of phase correction is reduced at the time the current 61 through relay 54 is cut off by the operation of flip-flop 46. However the rate of phase correction does not drop to zero until the current 62 applied to relay 53 is cut off by the operation of flip-flop 45. The curve 64 illustrates the partial application of brake power to the phasing device when relay 54 becomes de-energized and then the full application of the brake to stop the phasing device when relay 53 becomes de-energized.

At the beginning of the phasing cycle, when flip-flop circuits 45 and 46 are set, an "almost in-phase" condition will cause the flip-flop circuit 46 to reset immediately on the next phasing pulse due to coincidence of it and the wide pulse, preventing operating current from flowing into fast drive motor $M_2$. Slow drive motor $M_1$ will be energized until the in-phase relationship is reached, as previouly described. If the in-phase relationship exists at the beginning of the phasing cycle, when flip-flop circuits 45 and 46 are set, the next phasing pulse will coincide with the wide and narrow pulses to reset both flip-flop circuits, preventing phase correction from occurring. While not shown and described herein, it is obvious that well-known time delay circuits may be employed in connection with relays 53 and 54 to withhold power momentarily from the phasing motors to allow reset of the flip-flop circuits if the "almost in-phase" or in-phase relationships exist at the beginning of the phasing cycle, thus preventing pulsing of one or both motors for the brief interval between the setting of the flip-flops and the next phasing pulse.

FIGS. 4 and 5 illustrate by way of example a two-speed motor drive unit that may be employed in the system of FIG. 1 for effecting phase adjustment by rotation of the stator of the recorder drive motor. While phase adjustment may be effected in various ways, as well known in the art, fast and reliable phase adjustment may be effected in this particular way and is mentioned for the purpose of explaining the principles of phasing according to one embodiment of the invention. A detailed showing of the synchhronous motor and the mounting of the rotatable stator thereof is not deemed necessary since a phasing device of this character employing a single motor for rotating the stator of the drive motor is described in the U. S. Patent No. 2,907,826 to A. G. Cooley, the disclosure of which is incorporated herein by reference. Referring to FIGS. 4 and 5, the low speed motor $M_1$ rotates the drive shaft 66 to the phasing device through gear reduction 67 and a one-way drive clutch 68, which as shown consists of a helical spring surrounding and in frictional engagement with the surface of a cylindrical clutch sleeve attached to the drive shaft 66. This conventional form of unidirectional coupling, or any other suitable type, disengages the motor $M_1$ when the high speed motor $M_2$ is energized, preventing the motor $M_1$ from acting as a load on the motor $M_2$; but when the motor $M_2$ is de-energized, the motor $M_1$ drives the phasing mechanism through shaft 66 at a relatively slow speed, so that the recording mechanism may be stopped at exactly the in-phase position and the accuracy of phasing is enhanced. A brake may also be provided where the phasing is effected at a high rate of speed to reduce the phasing time. As shown an electromagnetic brake is employed which comprises a coil 71 mounted on the motor frame surrounding the shaft of the motor $M_2$ and a cooperating magnetizable brake disc 72 which is keyed to the shaft 66 and is operative to stop the rotation of the shaft when the brake coil 71 is energized.

It will be apparent that the invention provides a simple and reliable phasing system for automatically phasing two driven members which are to be operated in phase. The speed and accuracy of phasing are enhanced by effecting phasing correction at a rapid rate when the driven members are considerably out of phase and slowing down the phase correction when said members approach phase correspondence.

It is to be understood that the above-described system is illustrative of the application of the principles of the invention. Other arrangements within the scope of the invention may be devised by those skilled in the art. Thus, by way of example and not of limitation, other suitable pulse shaping and coincidence detection circuits may be employed in lieu of those shown and described above, and the phase correction may be effected in various ways as pointed out above. Furthermore numerous arrangements for obtaining two-speed phase adjustment may be used and a single motor adapted to operate at two speeds may be substituted for the dual-motor drive which has been described in detail; however in some instances this modification would not provide the rapid reduction in the rate of phase correction which is desired. It will also be understood that certain features of the phasing system may be employed in a system embodying the invention without one or more of the other novel features described herein. Accordingly it is evident that various changes may be made in the present invention as specifically described above without departing from the spirit of the invention as defined in the appended claims.

What is claimed is:

1. Phasing apparatus for two driven members operating at synchronous speed comprising, in combination, means for generating phasing pulses representing the position of each of said members whereby the time-spacing between the pulses from the respective members is a function of the displacement from the desired phase relation thereof, means for adjusting the phase of one of said members to correct the phase discrepancy, means for energizing said phase-adjusting means to commence phase adjustment at a predetermined rate at the initial stage of the phasing cycle, and means including a pulse-coincidence gate connected to said pulse-generating means for slowing down the rate of adjustment of said phase-adjusting means as the in-phase relation of said members is approached.

2. Phasing apparatus for facsimile systems and the like comprising, in combination, a first rotatable member, a second rotatable member to be brought into phase with said first member, generating means for generating a train of phasing pulses representing the angular position of each of said rotatable members, means for adjusting the phase of said second member, and means responsive to said trains of phasing pulses for maintaining a predetermined rapid rate of phase correction by said phasing means until the in-phase relation is approached and then reducing the rate of phase correction.

3. Phasing means according to claim 2, in which braking means is applied to the phasing means when the in-phase condition of the recorder mechanism is reached.

4. Phasing apparatus for facsimile systems and the like having scanning and recording mechanism to be operated in synchronism and in phase, comprising, in combination, means for driving said scanning mechanism and said recording mechanism at synchronous speed, means for adjusting the phase of one of said mechanisms, and means for controlling said phasing means, said controlling means including means for generating periodic pulses representing the angular position of the scanning means and of the recording means respectively, means for driving said phasing means at a relatively rapid rate while said mechanisms are out of phase by an amount greater than a predetermined value, gating means for detecting the occurrence of a phase discrepancy less than said predetermined amount, and means for reducing the rate of phase adjustment in response to the output current from said gating means.

5. In a facsimile telegraph unit to be operated at predetermined speed and phase, in combination, motor means for effecting both fast and slow phase correction of said unit, means responsive to the magnitude of the out-of-phase relation of said unit for generating a control current, and means controlled by said current for varying the motor means to change from fast to slow phase correction.

6. A facsimile recorder comprising recording mechanism, a driving motor for said mechanism, said motor having a rotatable stator for effecting phase adjustment, two-speed motor drive means for rotating said stator, means for generating a pulse at the beginning of each cycle of the recording mechanism, and means including said pulse-generating means for controlling said drive means to slow down the phase adjustment of said stator as the in phase relation of the recording mechanism is approached.

7. Phasing means according to claim 6, in which relay switching means is arranged to control the motor drive means.

8. A facsimile recorder comprising recording mechanism, means for phasing said recording mechanism, a first motor for driving said phasing means at a relatively rapid rate, a second motor for driving said phasing means at a relatively slow rate, and means for rendering said second motor operative to effect phasing at a slow rate when the in-phase relation of the recording mechanism is approached.

9. Phasing apparatus for two driven members operating at synchronous speed, comprising means for generating phasing pulses representing the position of each of said members whereby the time-spacing between the pulses from the respective members is a function of the displacement from the desired phase relation, means for adjusting the phase of one of said members to correct the phase discrepancy, a pulse detector connected to said pulse generating means for producing an output pulse when the respective phasing pulses approach coincidence, before actual pulse coincidence occurs, and means responsive to said output pulse for controlling said phase-adjusting means before the in-phase relation of said members is attained.

10. Phasing apparatus for facsimile systems and the like having scanning and recording mechanism to be operated in synchronism and in phase comprising, in combination, means for generating trains of pulses representing the position of the scanning and recording mechanisms, fast phase-adjustment means for changing the speed of one of said members at the initial stage of the phasing cycle, a pulse-coincidence detector connected to said pulse-generating means to produce an output current when the pulses from both said mechanisms approach coincidence in response to the phase correction, means controlled by the output current of said detector for slowing the rate of phase adjustment as the in-phase relation is approached, and means for disabling the phase-adjustment means when phase correspondence of the scanning and recording mechanisms is effected.

11. Phasing apparatus for facsimile systems and the like having scanning and recording mechanisms to be operated in synchronism and in phase comprising, in combination, means for generating trains of pulses representing the position of the scanning and recording mechanisms, means for effecting rapid phase correction during the initial part of the phasing cycle, a first gate for generating an output pulse when two pulses slightly displaced in time are impressed thereon, a second gate for generating an output pulse when two pulses coincident in time are impressed thereon, means for impressing both said trains of pulses upon both of said gates, means responsive to the output pulse from said first gate for reducing the rate of phase correction when the in-phase relation is approached, and means responsive to the output pulse from the second gate for disabling the phase correction when the in-phase relation is attained as indicated by coincidence of the phasing pulses from the scanner and recording mechanisms.

12. Phasing apparatus for facsimile systems and the like having scanning and recording mechanisms to be operated by synchronism and in phase comprising, in combination, means for effecting phase correction when said mechanisms are out of phase, means for generating trains of pulses representing the position of the scanning and recording mechanisms, signal shaping means for shaping the pulses of each train of pulses, gating means for said shaped pulses for generating a first output pulse when approximate coincidence of said shaped pulses indicates that the in-phase relation between said scanning and recording mechanisms is approached and for generating a second output pulse upon the occurrence of pulse coincidence indicating that the in-phase relation is reached, and means controlled by said output pulses for slowing and then stopping phase correction.

13. Phasing apparatus for two mechanisms to be operated in synchronism and in phase comprising, in combination, means for generating trains of pulses representing the position of the two mechanisms, means for effecting rapid phase correction during the initial part of the phasing cycle, gating means for generating a first output pulse when partial phase correction has been effected and a second output pulse when the in-phase relation between said mechanisms is reached, and means for controlling the phase correction means in response to said output pulses to first slow down the phase correction and then disable the phase correction means to maintain the synchronous in-phase drive of the two mechanisms.

References Cited

UNITED STATES PATENTS 2,874,218 2/1959 Allen et al. ---------- 178—69.5

ROBERT L. GRIFFIN, *Primary Examiner.*

R. L. RICHARDSON, *Assistant Examiner.*